United States Patent
Hayner et al.

(10) Patent No.: US 11,069,919 B2
(45) Date of Patent: *Jul. 20, 2021

(54) CATHODE ADDITIVES TO PROVIDE AN EXCESS LITHIUM SOURCE FOR LITHIUM ION BATTERIES

(71) Applicant: NANOGRAF CORPORATION, Chicago, IL (US)

(72) Inventors: Cary Michael Hayner, Chicago, IL (US); Rachid Amine, Bolingbrook, IL (US); Christine A. Frysz, Orchard Park, NY (US)

(73) Assignee: NANOGRAF CORPORATION, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/737,328

(22) Filed: Jan. 8, 2020

(65) Prior Publication Data

US 2020/0144659 A1  May 7, 2020

Related U.S. Application Data

(63) Continuation of application No. 16/174,094, filed on Oct. 29, 2018, now Pat. No. 10,608,279, which is a
(Continued)

(51) Int. Cl.
*H01M 10/44* (2006.01)
*H01M 10/0525* (2010.01)
(Continued)

(52) U.S. Cl.
CPC ....... *H01M 10/0525* (2013.01); *H01M 4/131* (2013.01); *H01M 4/133* (2013.01);
(Continued)

(58) Field of Classification Search
CPC ........ H01M 10/0525; H01M 10/0567; H01M 4/131; H01M 4/133; H01M 4/136;
(Continued)

(56) References Cited

U.S. PATENT DOCUMENTS 8,551,650 B2   10/2013   Kung et al.
8,835,027 B2    9/2014   Thackeray et al.
(Continued)

FOREIGN PATENT DOCUMENTS

CN    101837972 A    9/2010
JP    2009511415 A   3/2009
(Continued)

OTHER PUBLICATIONS

Lee et al., "Silicon Nanoparticles-Graphene Paper Composites for Li Ion Battery Anodes," Chem. Commun., vol. 46, (2010) pp. 2025-2027.
(Continued)

*Primary Examiner* — Jane J Rhee
(74) *Attorney, Agent, or Firm* — The Marbury Law Group PLLC

(57) ABSTRACT

A lithium ion electrochemical cell is described in which the lithium comprising further comprises a lithiation agent. The lithiation agent, which comprises a lithium constituent, is designed to provide an excess source of lithium to minimize capacity loss of the lithium ion electrochemical cell. The anode of the lithium ion cell comprises a material matrix comprising carbon, graphene and an active element such as silicon or tin.

12 Claims, 4 Drawing Sheets

Related U.S. Application Data continuation of application No. 14/745,747, filed on Jun. 22, 2015, now Pat. No. 10,115,998.

(51) Int. Cl.

| | | |
|---|---|---|
| *H01M 4/131* | (2010.01) | |
| *H01M 4/133* | (2010.01) | |
| *H01M 4/136* | (2010.01) | |
| *H01M 4/505* | (2010.01) | |
| *H01M 4/525* | (2010.01) | |
| *H01M 4/58* | (2010.01) | |
| *H01M 10/0567* | (2010.01) | |
| *H01M 4/02* | (2006.01) | |

(52) U.S. Cl.
CPC .......... *H01M 4/136* (2013.01); *H01M 4/505* (2013.01); *H01M 4/525* (2013.01); *H01M 4/5825* (2013.01); *H01M 10/0567* (2013.01); *H01M 2004/027* (2013.01); *H01M 2004/028* (2013.01); *H01M 2300/0025* (2013.01); *Y02T 10/70* (2013.01)

(58) Field of Classification Search
CPC .... H01M 4/505; H01M 4/525; H01M 4/5825; H01M 2004/027; H01M 2004/028; H01M 2300/0025

See application file for complete search history.

(56) References Cited

U.S. PATENT DOCUMENTS

| | | | |
|---|---|---|---|
| 10,115,998 B2 | 10/2018 | Hayner et al. | |
| 2003/0044608 A1 | 3/2003 | Yoshizawa et al. | |
| 2004/0248010 A1 | 12/2004 | Kato et al. | |
| 2006/0251967 A1 | 11/2006 | Goh | |
| 2007/0092432 A1 | 4/2007 | Prud'Homme et al. | |
| 2007/0111106 A1 | 5/2007 | Kim et al. | |
| 2008/0026297 A1 | 1/2008 | Chen et al. | |
| 2008/0160420 A1 | 7/2008 | Adachi et al. | |
| 2009/0053594 A1* | 2/2009 | Johnson ................. | H01M 4/90 429/163 |
| 2009/0117466 A1 | 5/2009 | Zhamu et al. | |
| 2009/0117467 A1 | 5/2009 | Zhamu et al. | |
| 2009/0169725 A1 | 7/2009 | Zhamu et al. | |
| 2011/0111303 A1 | 5/2011 | Kung et al. | |
| 2014/0015160 A1 | 1/2014 | Kung et al. | |
| 2015/0050561 A1 | 2/2015 | Zhang et al. | |
| 2015/0064568 A1* | 3/2015 | Yushin .............. | H01M 10/4235 429/233 |
| 2015/0111099 A1 | 4/2015 | Zhang | |
| 2015/0372304 A1 | 12/2015 | Hasegawa et al. | |
| 2016/0118652 A1 | 4/2016 | Wu et al. | |

FOREIGN PATENT DOCUMENTS

| | | |
|---|---|---|
| JP | 2011503804 A | 1/2011 |
| JP | 2011076931 A | 4/2011 |
| WO | WO2004047202 A1 | 6/2004 |
| WO | WO2011057074 A2 | 5/2011 |
| WO | WO2014118834 A1 | 8/2014 |

OTHER PUBLICATIONS

Kovtyukhova et al., "Layer-by-Layer Assembly of Ultrathin Composite Films for Micron-Sized Graphite Oxide Sheets and Polycations," Chem. Mater., vol. 11 (1999), pp. 771-778.

SIPO, Office Action, Chinese Application No. 201180070689.X, dated Jun. 18, 2015, 9pgs.

JPO, Office Action, Japanese Application No. JP2014510287, dated Feb. 10, 2015, 5pgs.

Extended Supplemental European Search Report, EP Application No. 11864999.5, dated Oct. 13, 2014.

Du et al., "Graphene Nanosheets as Electrode Material for Electric Double-Layer Capacitors," Electrochimica Acta, vol. 55 (2010), pp. 4812-4819.

Guo et al., "Electrochemical Performance of Graphene Nanosheets as Anode Material for Lithium-ion Batteries," Electrochemistry Communications, vol. 11 (2009), pp. 1320-1324.

Chou et al., "Enhanced Reversible Lithium Storage in a Nanosize Silicon/Graphene Composite," Electrochemistry Communications, vol. 12 (2010), pp. 303-306.

Xiang et al., "Graphene/nanosized Silicon Composites for Lithium Battery Anodes with Improved Cycling Stability," Carbon, vol. 49 (2011), pp. 1787-1796.

Tarascon et al., "Issues and Challenges Facing Rechargeable Lithium Batteries," Nature, vol. 414 (2001), pp. 359-367.

Armand et al., "Building Better Batteries," Nature, vol. 451 (2008), pp. 652-657.

Paek et al., "Enhanced Cyclic Performance and Lithium Storage Capacity of SnO2/Graphene Nanoporous Electrodes with Three-Dimensionally Delaminated Flexible Structure," Nano Letters, vol. 9, No. 1 (2008), pp. 72-75.

Yang et al., "Fabrication of Graphene-Encapsulated Oxide Nanoparticles: Towards High-Performance Anode Materials for Lithium Storage," Agnew. Chem. Int. Ed., vol. 49, No. 45 (2010), pp. 8408-8411.

Wu et al., "Graphene Anchored with Co2O4 Nanoparticles as Anode of Lithium Ion Batteries with Enhanced Reversible Capacity and Cyclic Performance," ACS Nano, vol. 4, No. 6 (2010), pp. 3167-3194.

Pan et al., "Li Storage Properties of Disordered Graphene Nanosheets," Chem. Mater., vol. 21, No. 14 (2009), pp. 3136-3142.

Banhart et al., "Structural Defects in Graphene," ACS Nano, vol. 5, No. 1 (2011), pp. 26-41.

Hummers et al., "Preparation of Graphitic Oxide," J. Am. Chem. Soc., vol. 80 (1959), p. 1339.

Coleman et al., "Defect Formation in Graphene Nanosheets by Acid Treatment: An X-ray Absorption Spectroscopy and Density Functional Theory Study," Journal of Physics D: Applied Physics, vol. 41, Feb. 21, 2008, pp. 1-4.

International Application No. PCT/US2016/035534, International Preliminary Report on Patentability, dated Jan. 4, 2018, 10pgs.

International Application No. PCT/US2016/035534, International Search Report and Written Opinion, dated Sep. 19, 2016, 13pgs.

* cited by examiner

CATHODE ADDITIVES TO PROVIDE AN EXCESS LITHIUM SOURCE FOR LITHIUM ION BATTERIES

TECHNICAL FIELD

The embodiments of the invention generally relate to the art of electrochemical cells, and more particularly, to secondary lithium battery electrode compositions.

BACKGROUND

Lithium (Li) ion electrochemical cells typically have a high energy density and are commonly used in a variety of applications which include consumer electronics, wearable computing devices, mobile equipment, satellite communication, spacecraft devices and electric vehicles. Lithium ion cells are particularly popular for use in large-scale energy applications such as low-emission electric vehicles, renewable power plants and stationary electric grids. Additionally, lithium ion cells are at the forefront of new generation wireless and portable communication applications. One or more lithium ion cells may be used to configure a battery that serves as the power source for these applications. The explosion in the number of higher energy demanding applications and the limitations of existing lithium ion technology are accelerating research for higher energy density, higher power density, higher-rate charge-discharge capability, and longer cycle life lithium ion cells. Today's commercialized lithium ion cells employ lithium intercalation materials for both the cathode and the anode.

Lithium ion cells are mainly composed of an anode, for example, graphite, a carbonate-based organic electrolyte, and a cathode comprising a cathode active material, for example, lithium cobalt oxide ($LiCoO_2$). Lithium ions are intercalated and deintercalated between the anode and the cathode through the electrolyte during discharge and charge. When the cell supplies power, or is discharging, lithium ions generally move from the negative electrode (anode) to the positive electrode (cathode). When the cell is storing energy for later use, or is charging, the opposite occurs. Lithium ions generally move from the positive electrode (the cathode) to the negative electrode (the anode) during charging. For the example, the theoretical capacities of a graphite anode and a $LiCoO_2$ cathode are about 372 mAh/g and less than about 160 mAh/g, respectively. These theoretical charge capacities, however, are too low for the recent surge in higher energy demanding applications.

Since it was first demonstrated that lithium metal can electrochemically alloy with other metals at room temperature, lithium alloying reactions with metallic or semi-metallic elements and various compounds have been investigated during the past few decades. Of the various lithium alloying elements studied for use in lithium ion cells, silicon (Si) has been considered one of the most attractive anode materials, because of its high gravimetric and volumetric capacity, and because of its abundance, cost effectiveness, and environmentally benign properties.

Increasing the specific capacity of anodes of lithium ion batteries through the substitution of graphite has tremendously influenced the direction of recent scientific efforts. It is well known, however, that the commercial graphite anode cannot meet these challenges due to its low theoretical capacity (372 mAh/g). Silicon, the second most abundant chemical element on earth, has a theoretical capacity of about 3,572 mAh/g, almost 10 times the capacity of graphite. Thus, there is a consensus that a breakthrough in capacity can be achieved by moving from classical intercalation reaction to an alloying reaction because the alloying reaction can store more lithium compared with intercalation reaction. Utilization of silicon offers the potential for a high capacity lithium alloying reaction capable of producing a lithium-rich phase (e.g. $Li_{15}Si_4$ and $Li_{22}Si_5$) compared with an intercalation reaction with graphite ($LiC_6$). However, there are still some areas for improvement. For example, the increased accommodation of $Li^+$ ions during charge-discharge cycles induces large volume variations (as much as about 370%) and stress on a bulk anode matrix that may ultimately shorten the useful life of the anode. Hence, different options have been pursued to alleviate the effect of volume expansion including the use of amorphous thin films, nanowires, nanotubes, and porous morphologies. Despite these advances, a significant capacity degradation during charge-discharge cycles is still observed. This suggests electrode fracturing which eventually leads to electrical contact losses. To address this specific issue, a promising anode material comprising a graphene-composite material in a graphite network was developed by one of the inventors of the embodiments of the present invention. The material is comprised of a continuous network of graphite regions integrated with, and in good electrical contact with a composite comprising graphene sheets and silicon, an electrically active material, wherein the electrically active material is dispersed between, and supported by, the graphene sheets.

Another existing limitation, however, is that the technology suffers from fast capacity fading. Fast capacity fading greatly hampers the application of silicon anode materials. Capacity fade is generally attributed to initial energy losses due to lithium ion consumption generated by side reactions on the active anode material surface. Hence there is a need to minimize these initial losses so that the available energy can be substantially improved.

Various forms of silicon electrode materials have been tested, including silicon particles mixed with a binder and conducting carbon, nanowires, thin films, and 3-dimensional porous particles. However, these are still not satisfactory, either because of poor cycling stability, cost of manufacturing, and/or insufficient capacity improvement. Although the exact causes for storage capacity loss upon cycling are still under investigation, various attempts to stabilize these structures have been reported. The most common approach is to encapsulate the silicon structure with a conducting carbonaceous layer, in hope that this would better retain the silicon fragments from being disconnected from the conducting electrode. Various precursors can be used for encapsulation, including resorcinol-formaldehyde gel, poly(vinyl chloride)-co-vinyl acetate or polyvinyl chloride and chlorinated polyethylene, glucose, and fullerene ($C_{60}$). Noticeable improvements were achieved, but capacity degradation was not eliminated.

SUMMARY

One embodiment of the invention provides an electrochemical cell, comprising:
a) a negative electrode comprising a negative electrode active material having an active constituent;
b) a positive electrode comprising a lithium containing positive electrode active material;
c) a lithium containing lithiation agent located in at least one of the positive electrode and the negative electrode, wherein lithium from the lithiation agent irreversibly reacts with the active constituent of the negative electrode active material to form a lithium compound in and/or on the negative electrode; and c) an ionically conductive electrolyte located between the positive electrode and the negative electrode.

Another embodiment of the invention provides an electrode, comprising:

a) a first electrode active material; and b) a lithiation agent comprising a lithium constituent having a lithiation agent extraction voltage combined with the electrode active material thereby creating an electrode material mixture, wherein at least a portion of the lithium constituent within the lithiation agent is irreversibly reactable with at least a portion of one constituent of a second electrode active material that is different than the first electrode active material.

Another embodiment of the invention provides a method of operating a secondary lithium ion battery comprising a negative electrode comprising a negative electrode active material having an active constituent, a positive electrode comprising a lithium containing positive electrode active material, a lithium containing lithiation agent located in at least one of the positive electrode and the negative electrode, and a separator and an ionically conductive electrolyte located between the positive electrode and the negative electrode. The method comprises applying a lithium extraction voltage to the battery to irreversibly react lithium from the lithiation agent with the active constituent of the negative electrode active material to form a lithium compound in and/or on the negative electrode.

DETAILED DESCRIPTION

Figure 1A:
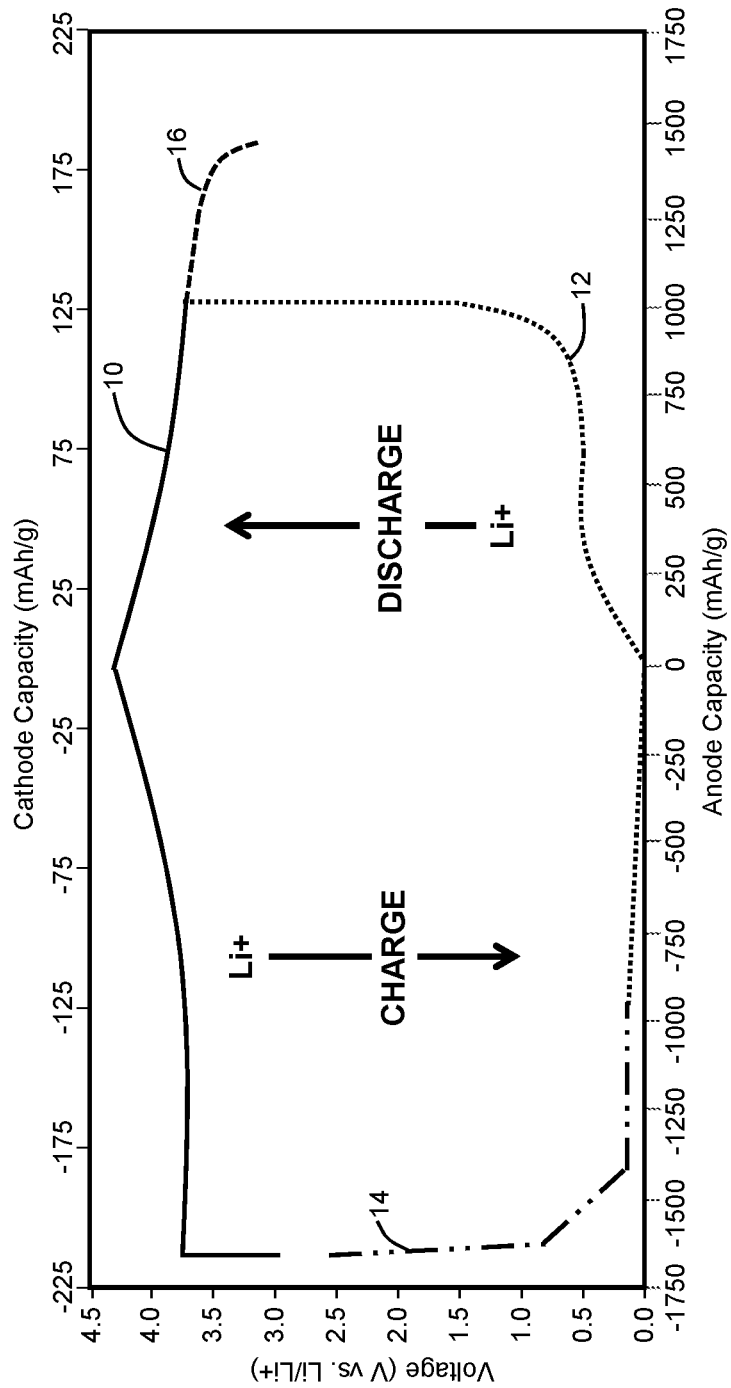
FIG. 1A illustrates a modeled capacity vs. voltage performance of a lithium-ion electrochemical cell comprising an anode and a cathode that does not comprise a lithiation agent therewithin.

The embodiments of the present invention, therefore, provide a variety of lithium containing cathode additives that serves as an auxiliary lithium ion source to mitigate consumption of lithium ions that occurs from the side reactions on the active anode material surface. The availability of auxiliary lithium ions act as controllable lithium reservoirs that lessen use of lithium ions within the cathode active material. This results in a higher reversible capacity between the anode and cathode active materials. Furthermore, this is achieved with minimal increase in cell mass due to the low residual weight from the embodiment auxiliary lithiation agent.

Lithium-ion secondary electrochemical cells operate by a reversible exchange of lithium ions between a negative electrode, i.e., the anode and a positive electrode, i.e., the cathode. During charge, lithium ions deintercalate (or are removed from) the cathode and flow through the electrolyte to intercalate (or are inserted into) the anode. Electrons flow from a battery charger in the same direction of the flow of ions. The lithium ions remain in the anode (stores power) until electrical power is required from the battery (supplies power). Deintercalation is also defined as delithiation. Intercalation is also defined as lithiation.

During discharge, lithium ions deintercalate the anode and intercalate the cathode. It is during discharge that the lithium ion battery provides electrical power to do work (supply power). During discharge the electrons flow concurrent to the flow of ions in the electrolyte through an external circuit, i.e., through the application device requiring the electrical power. This lithium ion intercalation/deintercalation process is reversible and repeatable over multiple charge/discharge cycles.

It is known that during lithiation/delithiation, the formation of metastable phases may occur within the electrodes of the battery. For example, batteries comprising silicon nanowire anodes and lithium iron phosphate ($LiFePO_4$) cathodes form amorphous and crystalline material phases during discharge/charge cycling that have been associated with reduced rate capability and capacity fade. Hence, not only is the anode material and structure important, but also the mechanism of electrochemical lithiation is important to the performance of secondary lithium ion electrochemical cells, and particularly for high energy demanding applications. Of particular importance is the mechanism of initial electrochemical lithiation of silicon anodes in secondary lithium ion batteries.

During initial intercalation/deintercalation (lithiation/delithiation) in which the cell is initially charged and then discharged, there exists a voltage window between anode/cathode pairs within which a material two-phase region exists, and from which a portion of the lithium ions from the cathode active material irreversibly reacts with an anode active constituent, such as silicon, thereby forming a lithium containing structure or reaction product. A portion of this lithium containing structure is incapable of reversibly intercalating with the anode and cathode of the electrochemical cell. In this irreversible reaction, some of the lithium ions released from the cathode active material, intended to reversibly intercalate between the anode and cathode, are thus "consumed" in the irreversible reaction.

In addition, a reduction reaction initiates the formation of a passive solid-electrolyte-interphase (SEI) layer generally consisting of organic and inorganic lithium compounds on the surface of the anode. The formation of the SEI layer also contributes to the depletion of the number of lithium ions as a portion of the lithium becomes encased within the SEI layer. This undesirable "consumption" or loss of lithium ions from the cathode active material reduces the number of lithium ions intended to achieve the capacity for which the electrochemical cell was designed. In other words, what results is a loss of capacity of the cathode, and ultimately, the electrochemical cell.

Thus, the embodiments of the present invention provide for a cathode having a lithiation agent incorporated with the cathode active material. The lithiation agent, which comprises a lithium constituent, provides an auxiliary source of lithium to the cathode and the electrochemical cell thereof. The lithiation agent is preferably designed to provide a sacrificial source of lithium ions that is reacted and consumed with the active constituent of the anode, for example, silicon, within the anode active material. In addition, the lithiation agent provides a further sacrificial source of lithium that is reacted and consumed in the formation of the solid electrolyte interphase layer. Therefore, the lithium within the sacrificial lithiation agent is preferentially consumed during the initial discharge and charge cycles, thus preserving the lithium ions within the cathode active material for which the cell was designed to function. As a result, the lithium ions within the cathode active material are more fully utilized to generate reversible capacity through the active exchange of lithium ions between the anode and cathode. Thus, the intended capacity of the cathode and of the lithium-ion cell is preserved, minimizing reduced capacity.

The embodiments of the present invention, therefore, provide a cathode and secondary lithium ion electrochemical cell thereof, that minimizes capacity loss. Specifically, the embodiment of the present invention is of a cathode or positive electrode for a lithium-ion electrochemical cell having a cathode active material that at least comprises a lithium constituent and which comprises a sacrificial lithiation agent, having additional lithium incorporated therewithin. Such sacrificial lithiation agents may include, but are not limited to, a lithium salt, a lithium carbonate, a lithium phosphate, a lithium phosphide, a lithium fluoride, a lithium sulfide, a lithium sulfate, a lithium oxide, a lithium hydroxide, a lithium nitride, a lithium nitrate, a lithium iodide, or a lithium iodate. The agents may be binary, ternary, quaternary, etc. compounds. For example, a lithium oxide includes a lithium metal oxide, such as an antifluorite lithium metal oxide (e.g., $Li_5FeO_4$), a lithium fluoride includes a lithium metal fluoride, etc. The additional lithium, provided by the sacrificial lithiation agent, helps preserve and may increase the capacity of the cell permitting multiple discharge and recharge cycles without significant capacity loss. In addition, the embodiment of the present invention is of a secondary lithium ion electrochemical cell comprising an anode composed of an anode active material of a material matrix comprising carbon, graphene, and a lithium alloying element. A preferred lithium alloying element comprises silicon. A preferred cathode active material comprises a lithium oxide such as $LiNi_xCo_yAl_zO_2$ where x, y, and z are greater than 0 and x+y+z=1. However, other preferred cathode active materials may include, but are not limited to, $LiCoO_2$, $LiFePO_4$, $LiMn_2O_4$ and combinations thereof. The cathode material is preferably fabricated by mixing proportions of at least the cathode active material and lithiation agent together. Alternatively, the cathode may be fabricated in a thermal process in which stoichiometric proportions of at least one of the cathode active material constituents is combined with the lithiation agent with applied heat.

The electrochemical cell of the embodiments of the present invention is of a secondary lithium-ion cell comprising an anode or negative electrode that is preferably composed of a graphene based matrix material. More specifically, the anode may comprise a plurality of graphene sheets that are preferably arranged in a vertical stack. The vertical stack structure preferably has a continuous network of graphitic regions comprising both crystalline and non-crystalline "disordered" portions of graphene. Furthermore, the continuous network of graphitic regions is integrated with a composite comprising: (a) disordered portions of the vertical stack of graphene sheets; and (b) an anode active constituent, such as silicon (Si), tin (Sn), tin oxide, antimony (Sb), aluminum (Al), silver (Ag), germanium (Ge), gallium (Ga), magnesium (Mg), zinc (Zn), lead (Pb), bismuth (Bi), carbon (C), titanium oxide, lithium titanium oxide, their alloys, intermetallics, and mixtures thereof, preferably in a nano-particle form.

In addition, at least some of the graphene sheets within the vertical stack may comprise defect pores formed by in-plane carbon vacancies. In a preferred embodiment, at least a plurality of the defect pores is randomly distributed throughout the graphene sheet structure. Further detail about the preferred anode active material and structure thereof can be found in U.S. Pat. Nos. 8,551,650 and 8,778,538, both to Kung et al., all of which are incorporated herein by reference. Other suitable active negative electrode material compositions may include, but are not limited to, graphite, synthetic graphite, coke, fullerenes, other graphitic carbons, niobium pentoxide, tin alloys, silicon, silicon alloys, silicon-based composites, titanium oxide, tin oxide, and lithium titanium oxide.

The form of the anode may vary, but typically, the anode is a thin sheet or foil of the material, pressed or rolled on a metallic anode current collector, i.e., preferably comprising copper, to form an anode component. In the electrochemical cell of the embodiments of the present invention, the anode component may have an extended tab or lead of the same metal as the anode current collector, i.e., preferably copper, integrally formed therewith. Alternatively, the anode may be formed in some other geometry, such as a bobbin shape, cylinder or pellet to allow an alternate low surface cell design.

The electrochemical cell of the embodiments of the present invention further comprises a cathode composed of an electrically conductive material that serves as the other, positive electrode of the cell. The cathode is preferably of solid materials and the electrochemical reaction at the cathode involves conversion of lithium ions that migrate back and forth between the anode, i.e., a first electrode, and the cathode, i.e., a second electrode, into atomic or molecular forms. During discharge of the cell, lithium ions flow from the anode or negative electrode to the cathode or positive electrode. To recharge such secondary cells, lithium ions from the cathode or positive electrode are intercalated into the anode by applying an externally generated electrical potential to the cell. The applied recharging potential serves to draw lithium ions from the cathode material, through the electrolyte and into the anode.

The solid cathode may comprise a cathode active material containing lithium and at least one non-metal element, such as lithium metal oxide, lithium metal fluoride, lithium sulfide, lithium metal sulfide, lithium metal phosphate, lithium metal silicate or combinations thereof. In a preferred embodiment, the cathode active material comprises $LiNi_xCo_yAl_zO_2$, where x, y, and z are greater than 0 and wherein x+y+z=1. Other preferred cathode active materials may include, but are not limited to lithium cobalt oxide ($LiCoO_2$), lithium iron phosphate ($LiFePO_4$) and lithium manganese oxide ($LiMn_2O_4$). Additional preferred cathode active materials may also include, but are not limited to, $LiNi_xMn_yCo_zO_2$, where $0.3 \leq x \leq 1.0$, $0 \leq y \leq 0.45$, and $0 \leq z \leq 0.4$ with x+y+z=1. Furthermore, the cathode active material may comprise $Li_{1+x}Ni_\alpha Mn_\beta Co_\gamma O_2$, where x ranges from about 0.05 to about 0.25, $\alpha$ ranges from about 0.1 to about 0.4, $\beta$ ranges from about 0.4 to about 0.65, and $\gamma$ ranges from about 0.05 to about 0.3.

The metal other than lithium in the above cathode active material may comprise a transition metal from the Periodic Table of Elements, such as iron (Fe), manganese (Mn), cobalt (Co), nickel (Ni), copper (Cu), vanadium (V), chromium (Cr), non-transition metals such as bismuth (Bi), and combinations thereof. Specific examples of cathode active materials may include $MF_x$ where $0 \leq x \leq 3$, $Li_xMF_x$ where $0 \leq x \leq 3$, $LiMPO_4$, $Li_2MSiO_4$ composite layered-spinel structures such as $LiMn_2O_4$—LiMO where M is a transition metal from the Periodic Table of Elements, such as iron (Fe), manganese (Mn), cobalt (Co), nickel (Ni), copper (Cu), vanadium (V), chromium (Cr), a non-transition metal such as bismuth (Bi), and combinations thereof. Lithium rich positive electrode active materials of particular interest can also be represented approximately by the formula $Li_{1+x}Ni_aMn_bCO_cA_dO_{2-z}F_z$, where x ranges from about 0.01 to about 0.3, a ranges from about 0 to about 0.4, b ranges from about 0.2 to about 0.65, c ranges from 0 to about 0.46, d ranges from 0 to about 0.15 and Z ranges from 0 to about 0.2 with the proviso that both a and c are not zero, and where A is magnesium (Mg), strontium (Sr), barium (Ba), cadmium (Cd), zinc (Zn), aluminum (Al), gallium (Ga), boron (B), zirconium (Zr), titanium (Ti), calcium (Ca), selenium (Ce), yttrium (Y), niobium (Nb), chromium (Cr), iron (Fe), vanadium (V), lithium (Li) or combinations thereof. A person of ordinary skill in the art will recognize that additional ranges of parameter values within the explicit compositional ranges above contemplated and are within the present disclosure.

The cathode active material is preferably formed by the chemical addition, reaction, or otherwise intimate contact of various oxides, phosphates, sulfides and/or metal elements, preferably during thermal treatment, sol-gel formation, chemical vapor deposition, or hydrothermal synthesis in mixed states. The cathode active material thereby produced may contain metals, oxides, phosphates, and sulfides of Groups, IB, IIB, IIIB, IVB, VB, VIB, VIIB, VIII, and VIIA which includes the noble metals and/or other oxide and phosphate compounds. A preferred cathode active material is a reaction product of stoichiometric proportions of at least fully lithiated to non-lithiated, $LiNi_{0.8}Co_{0.15}Al_{0.05}O_2$.

The cathode of the embodiments of the present invention further comprises a lithiation agent that includes a lithium constituent. As defined herein, a "lithiation agent" is material that comprises at least one lithium constituent or element that is combined with an electrode active material of either the cathode or the anode. The lithiation agent is preferably mixed with the cathode active material after the material has been formulated during electrode fabrication. Alternatively, the lithiation agent may be combined with the anode active material. For example, the lithiation agent may be combined with the constituents during fabrication of the respective cathode active material or anode active material.

In a preferred embodiment, the lithiation agent provides an excess amount of lithium within the cathode active material and cathode structure thereof. This increased amount of lithium within the respective cathode of a lithium-ion electrochemical cell results in a significant increase in reversible capacity of the cell. In other words, the additional lithium provided by the lithiation agent provides "sacrificial" lithium that is at least partially consumed during the irreversible chemical reaction that occurs during the initial charge/discharge cycle of the lithium-ion cell.

In one non-limiting embodiment, the incorporation of the lithiation agent thus provides excess lithium that is preferentially consumed in an irreversible reaction with a portion of the anode active material in lieu of the lithium contained within the cathode active material. Preferably, the lithium from the lithiation agent deintercalates from the lithiation agent at a lower voltage (i.e., "lithium agent extraction voltage") than that at which the lithium deintercalates from the cathode or anode active material. Thus, during the one or more initial charge and discharge cycles of the battery, the battery may be operated at or above the lithium agent extraction voltage and below the cathode and/or anode active material delithiation voltage. During such operation at the lithium agent extraction voltage, the deintercalated lithium from the lithiation agent deintercalates and irreversibly reacts with a constituent of the anode active material, while the lithium from the active cathode and/or anode material does not deintercalate at the lithium agent extraction voltage. In an alternative embodiment, the cell may operate similar to a cell without the lithiation agent, and lithium from both the lithiation agent and the lithium from the active cathode and/or anode material may deintercalate at the lithium agent extraction voltage. Furthermore, in this alternative embodiment, the lithium from the active cathode and/or anode material may deintercalate at a lower voltage than lithium from the lithiation agent.

As used herein, irreversibly reacts means reacts to form a reaction product (e.g., a lithium compound) in or on the anode material which does not substantially deintercalate (e.g., deintercalates 0 to 2 at. %) lithium during subsequent discharge operation at the designed (e.g., normal) operating discharge voltage range of the battery. The lithium compound may be, for example, a lithium-silicon crystalline compound or phase (e.g., $Li_{15}Si_4$) located in the anode and/or a solid electrolyte-interphase (SEI) layer at the anode surface. The SEI layer is generally accepted to be a thin organic-inorganic passivation layer that forms on the surface of the anode.

Thus, in one non-limiting embodiment, during the one or more initial charge steps, the lithium deintercalates from the lithiation agent and irreversibly reacts with the constituent of the anode active material (e.g., with silicon), while the lithium from the positive electrode active material does not deintercalate at the lithium agent extraction voltage. However, during the plurality of subsequent charge steps the battery (i.e., during subsequent charge operation at the designed (e.g., normal) operating charge voltage range of the battery), lithium deintercalates from the positive electrode active material and intercalates into the negative electrode.

In an alternative non-preferred embodiment, the lithium from the cathode (e.g., positive) electrode active material may deintercalate first at a lower extraction voltage, and lithium from the cathode lithiation agent may deintercalate second at a higher extraction voltage. Likewise, the lithium from the active cathode material may deintercalate during the one or more initial charge steps in this alternative embodiment.

As previously mentioned, lithium ion cells, having an anode composed of an anode active material comprising an anode active constituent, can experience a significant loss in capacity within certain voltage windows. Significant capacity losses occur particularly during the initial charge/discharge cycle of the electrochemical cell. During the initial charge/discharge cycle, lithium irreversibly reacts with the anode active constituent, e.g., silicon, contained within the anode active material. More specifically, an irreversible chemical reaction generally occurs within a voltage window during intercalation/deintercalation (lithiation/delithiation). As defined herein, an anode active constituent is an electrochemically active material, element, or combination of elements that resides within the anode active material matrix. The anode active constituent is reactable with lithium, such as lithium composed within the cathode active material, to thus form a lithium alloy thereof that may not fully reversibly intercalate and deintercalate the anode and cathode of the electrochemical cell. Specifically, when charge/discharge occurs, a portion of the lithium alloy within a particular voltage window for an anode/cathode pair irreversibly forms a lithium alloy residual, thereby reducing cathode capacity during charge/discharge cycling.

Table I provides a list of possible anode active constituents and their respective properties.

TABLE I

| Element | Gravimetric Capacity (mAh/g) | Volumetric Capacity (mAh/cm³) |
|---|---|---|
| Silicon (Si) | 4,200 | 2,400 |
| Carbon (C) | 372 | 890 |
| Germanium (Ge) | 1,568 | 2,300 |
| Tin (Sn) | 990 | 2,020 |
| Phosphorus (P) | 2,600 | 2,250 |
| Antimony (Sb) | 660 | 1,890 |
| Lead (Pb) | 549 | 1,790 |

This reaction, between the anode active constituent and lithium from the cathode active material, which occurs within a voltage window of an anode/cathode pair, allows a portion of the lithium within the cathode active material that was originally intended to achieve the capacity for which the secondary electrochemical cell was designed, to be irreversibly lost from the cathode. Thus, as a result, the cell's capacity irreversibly decreases because of the diminished population of available lithium ions. This irreversible reaction is generally explained by the following equations. In this example, silicon is used as the anode active constituent.

During discharge $$Si(crystalline) + xLi^+ + xe^- \rightarrow Li_xSi(amorphous) + (3.75-x)Li^+ + (3.75-x)e^- \quad \text{Eq. 1}$$

$$Li_{15}Si_4(crystalline) \quad \text{Eq. 2}$$

During charge $$Li_{15}Si_4(crystalline) \rightarrow Si(amorphous) + yLi^+ + ye^- + Li_1Si_4(residual) \quad \text{Eq. 3}$$

The mechanism of electrochemical lithiation is represented by the chemical reaction equations provided above. During the first lithiation discharge, illustrated by equation 1, a two-phase region exists within a voltage window wherein the reaction product is crystalline silicon from within the anode active material becomes an amorphous Li—Si alloy. The highly lithiated amorphous $Li_xSi$ phase immediately crystallizes to form a second reaction product crystalline $Li_{15}Si_4$ at about 60 mV (vs. Li/Li$^+$) as shown by equation 2. As defined herein, a two-phase region is a potential zone at or about a voltage wherein a material transforms from one phase, e.g., an amorphous Li—Si alloy to a second phase, e.g., a crystalline Li—Si alloy. Another two-phased region within a voltage window exists during the first delithiation charge. During the first delithiation charging, illustrated by equation 3, the previously formed crystalline $Li_{15}Si_4$, as shown in equation 2, partially becomes amorphous silicon; however, residual crystalline $Li_{15}Si_4$ irreversibly remains within the anode structure. Thus, not all of the initially available lithium ions de-lithiate from the anode and re-lithiate the cathode. If the voltage window within which two-phase materials can form, repeats itself with continued charge/discharge cycling, then the reactions per equations 2 and 3 are repeated and the reversible capacity quickly fades due to irreversible depleting of lithium from the cathode active material.

In addition to the formation of a lithium silicon compound, as discussed above, capacity loss typically exhibited by a lithium ion cell having an anode comprised of silicon is also believed to be attributed to the formation of a solid electrolyte-interphase (SEI) layer at the anode surface. The SEI layer is generally accepted to be a thin passivation layer that forms on the surface of the anode. The SEI layer forms during charge and discharge cycling of the cell in which the electrolyte undergoes a reduction reaction and adheres to the anode's surface. As defined herein a "passivation layer" is a coating which minimizes or prevents a chemical reactivity. In regards to the lithium ion electrochemistry of the embodiments of the present invention, the SEI passivation layer hinders the intercalation of lithium ions with the anode. In the case of the first initial charge discharge cycles, particularly during the first charge in which lithium ions move from the cathode to the anode, the formation of the SEI layer is particularly detrimental to the population of the available lithium ions. Specifically, during the initial charge discharge cycles, the electrical potential of the anode with respect to the lithium metal is typically below 1 V. This relatively low electrical potential differential creates a condition that reduces the electrolyte and forms the SEI layer that generally consists of organic and inorganic lithium compounds formed from a portion of the anode active material and/or a portion of the anode active constituent, such as silicon. Thus, the formation of the SEI reduces the overall population of lithium ions by one, reacting lithium ions from the respective electrodes and/or the electrolyte solution within the SEI layer itself and, secondly, by trapping available lithium ions within the anode structure. Furthermore, the initial SEI layer may become structurally unsound and may break off from the anode surface. If this occurs, then a new SEI layer typically forms on the anode surface, thus further depleting the available amount of lithium ions from intercalating between the anode and cathode.

In an embodiment stable passivation layers that minimize the amount of lithium ion consumption during cycling, may be generated by subjecting the cell to a conditioning protocol. A cell conditioning protocol is a process in which an electrochemical cell, i.e. a lithium-ion cell, is subjected to a partial charge and/or discharge for a period of time. In addition, a cell may also be subjected to different temperatures during this partial charge/discharge process. The conditioning protocol is designed to encourage the formation of a stable passivation layer that minimizes further consumption of lithium ions. Each conditioning protocol is specifically designed for a cell's chemical composition.

Furthermore, subjecting a lithium-ion cell to a conditioning protocol may improve cycling of the cell. The formation of the stable passivation layer generally increases the stability of the electrode structure and thus, results in improved management of the charge-discharge cycle. Often, during the first charge when the SEI layer is initially formed, it has been shown that it is beneficial to hold the cell in a charged or partially-charged state for a period of time in order to form a more stable and resilient layer that prevents continuous consumption of Li ions and promotes improved cycle life.

Additionally, the temperature environment of the cell and time held in a particular state can also be modified in order to improve the SEI layer formation. Without being restricted to any particular theory, it is believed that allowing rest periods during formation cycling (e.g., resting cells in a charged state) may reduce irreversible capacity losses from SEI layer formation and improve stress relaxation. It has been unexpectedly found that the cycle life of a lithium ion cell containing a negative electrode with silicon nanostructures can be substantially improved by holding the cell in a charged state for an extended pre-determined period of time after the initial charge before proceeding to the discharge. For example, this could be accomplished by partially charging a cell to a predetermined voltage, or alternatively state-of-charge, and holding the cell at the suggested state for an extended period of time (e.g. for up to 24 hours) before completing the initial charge formation cycle.

In another example, the cell storage temperature (e.g. such as storage at 55° C.) can also be controlled to further modify the SEI layer, while undergoing formation protocol cycling. The inclusion and invention of a lithiation agent to provide a source of lithium ions to improve reversible capacity can further assist in the generation of a resilient SEI layer when combined with formation cycles. A lithiation agent can be chosen such that it preferentially reacts first to donate its lithium ions to the generation of the SEI layer, and particular formation cycling protocols can be used to improve SEI formation before charging with the reversible cathode material.

Thus, the embodiments of the present invention provide for a lithiation agent in which at least a portion of lithium contained therewithin is sacrificially reacted with at least a portion of the anode active constituent, e.g., silicon instead of the lithium within the cathode active material intended to achieve the capacity for which the electrochemical cell was designed. Therefore, this irreversible side reaction of the lithium contained within the cathode active material is eliminated or minimized. In addition, the embodiments of the present invention provide for the lithiation agent in which at least a portion thereof is consumed in the formation of the solid-electrolyte-interphase (SEI) layer. As a result, the amount of lithium ions utilized for the reversible exchange between the anode and cathode active materials is not diminished and the capacity is not reduced.

In contrast to the embodiments of the present invention, Thackeray et al. in U.S. Pat. No. 8,835,027 discloses the use of cathode precursors to attempt to mitigate loss in cell capacity. Unlike the embodiments of the present invention, Thackeray et al. discloses a cathode composed of a precursor material comprising a $Li_2O$ containing material. As disclosed by Thackeray, $Li_2O$ is extracted from the cathode thereby providing "a source of surplus lithium to load a negative electrode during the activation step and that this lithium can be used during a subsequent discharge reaction not only with the host electrode component from whence it came, but also with the charged or partially charged components in the parent electrode that are susceptible to reaction with lithium" (column 5, lines 44-49) Thus, it is believed that the $Li_2O$ containing material of Thackeray does not participate in an irreversible reaction with an anode active constituent to form an lithium compound which does not substantially delithiate lithium during discharge.

In contrast to Thackeray, the embodiment of the present invention provides a positive electrode that comprises a sacrificial lithiation agent in addition to the electrode active materials that comprise the working cathode, i.e., the electrode designed to achieve the intended electrochemical cell capacity. This lithiation agent provides an excess source of lithium that at least partially irreversibly reacts with the anode active constituent, such as silicon that is comprised within the anode active material during initial charge/discharge cycling. The embodiments of the present invention therefore provide a sacrificial amount of lithium, provided by the auxiliary lithiation agent, a portion of which irreversibly reacts with the active anode constituent. In so doing, reaction of the lithium comprised within the working cathode active material is eliminated or minimized and cell capacity is preserved.

In a preferred embodiment, the lithiation agent may be a metal or non-metal comprising at least one of a lithium salt, a lithium carbonate, a lithium phosphate, a lithium phosphide, a lithium fluoride, a lithium sulfide, a lithium sulfate, a lithium oxide, a lithium hydroxide, a lithium nitride, a lithium nitrate, a lithium iodide, or a lithium iodate. The metal may comprise at least one transition metal selected from the group consisting of the Groups IB to VIIB, VIIA, and VIII of the Periodic Table of Elements. Specific preferred metals include, but are not limited to, iron (Fe), manganese (Mn), cobalt (Co), nickel (Ni), copper (Cu), vanadium (V), and chromium (Cr). In addition, the lithiation agent may also comprise bismuth (Bi). In a more preferred embodiment, the lithiation agent may comprise lithium azide ($LiN_3$). The addition of lithium azide ($LiN_3$) with the cathode active material provides a specific electrical capacity of about 567 mAh/g at a voltage of about 3.5 vs. $Li/Li^+$ to the cathode. Additional preferred lithiation agents may include, $Li_xMF_x$, where $0 \leq x \leq 3$ and M may comprise one or more of the elements iron (Fe), manganese (Mn), cobalt (Co), nickel (Ni), copper (Cu), vanadium (V), chromium (Cr), and bismuth (Bi). Specific examples may include, but are not limited to, $Li_3FeF_3$, $Li_2CuF_2$, $Li_2MnF_2$, and $Li_3MnF_3$.

Further examples of lithiation agents may comprise, $Li_{2n}AxO_{y+n}$ where $0.5 \leq n \leq 5$, $0 \leq x \leq 3$, $1 \leq y \leq 5$ and A may comprise transition metals, such as nickel (Ni), titanium (Ti), iron (Fe), cobalt (Co), manganese (Mn), vanadium (V), molybdenum (Mo), and niobium (Nb), metalloids, such as silicon (Si), germanium (Ge), and boron (B), non-transition metals, such as tin (Sn), aluminum (Al), and gallium (Ga), non-metals, such as carbon (C), hydrogen (H), phosphorous (P) and mixtures thereof. Yet, another preferred lithiation agent may comprise lithium salts, including but not limited to, LiBr, LiI, LiCl, $LiN_3$, $Li_2O$, $Li_2O_2$, $Li_2C_4O_4$, $Li_2C_2O_4$, $Li_2C_3O_5$, $Li_2C_4O_6$, $Li_2C_2N_4O_2$ in addition to polymeric constituents such as $[(COCON(Li)N(Li)]_n$. Still further examples of lithiation agents may comprise $Li_xS$ where x ranges from 0.01 to 2, $Li_{3-x}M_xN$ where $0 \leq x \leq 0.8$ and M comprises cobalt (Co), nickel (Ni), copper (Cu), and combinations thereof and in addition to $Li_{2-x-y}A_yM_xN$ where $0 \leq x \leq 0.8$, $0 \leq y \leq 1$, A is a lithium (Li) vacancy and M comprises cobalt (Co), nickel (Ni), copper (Cu), and combinations thereof.

Specific examples of lithiation agents may include, but are not limited to, $Li_2CO_3$, $Li_3FeF_3$, $Li_5FeO_4$, $Li_xS$ (where x ranges from 0.01 to 2), $Li_2CuF_2$, $Li_2MnF_2$, $Li_3MnF_3$, $Li_3FeF_3$, $Li_2C_3O_5$, $Li_{2.6}Co_{0.4}N$, and $Li_2S$. In addition, lithiation agents may comprise $Li_6MnO_4$, $Li_6CoO_4$, $Li_4MoO_5$, $Li_8IrO_6$, and LiOH.

Lithium within the lithiation agent is preferably extracted from the lithiation agent when an electrical voltage or range of electrical voltages is applied to the lithiation agent. Thus, the release of lithium from the lithiation agent can be controlled by the application of an electrical voltage within a specific range of electrical voltages, referred to as the lithium extraction window. Table II, shown below, illustrates the different approximate lithium extraction window voltages in which lithium is released from the respective lithiation agent. For example, lithium is extracted from antifluorite lithium metal oxide (e.g., $Li_5FeO_4$) when a voltage of between about 3.5 to about 4.5 volts is applied to the material. Therefore, for the lithium to be extracted from a lithiation agent material and, thus, react with the anode active element, a specific voltage or range of voltages is be applied to the lithiation agent material. Hence, the utilization of the lithiation agent within the cell requires that the lithium-ion electrochemical cell be designed such that discharge and or charging within the cell, occurs within the lithium voltage extraction window that is specific to the lithiation agent material, and which is preferably lower than the voltage required to delithiate the cathode and/or anode active material. This, therefore, requires that the anode and cathode within the cell be specifically paired such that discharge and/or charge occur within the required lithium extraction voltage specified by the lithiation agent material.

TABLE II

| Lithiation Agent Class | Specific Capacity (mAh/g)* | Li Extraction Window (V vs. Li/Li$^+$) |
|---|---|---|
| Antifluorite Lithium Metal Oxide | 867 (700) | 3.5-4.5 |
| Lithiated Metal Fluorides | 712 (448) | 2.0-4.3 |
| Lithium Salts | 567 (430) | 3.0-4.5 |
| Lithiated Metal Nitrides | (760) | 1.0-1.5 |
| Lithium Sulfide | 1166 (>800) | 2.0-3.0 |

*Theoretical capacity values. Experimentally achieved values are listed in parenthesis.

Figure 1B:
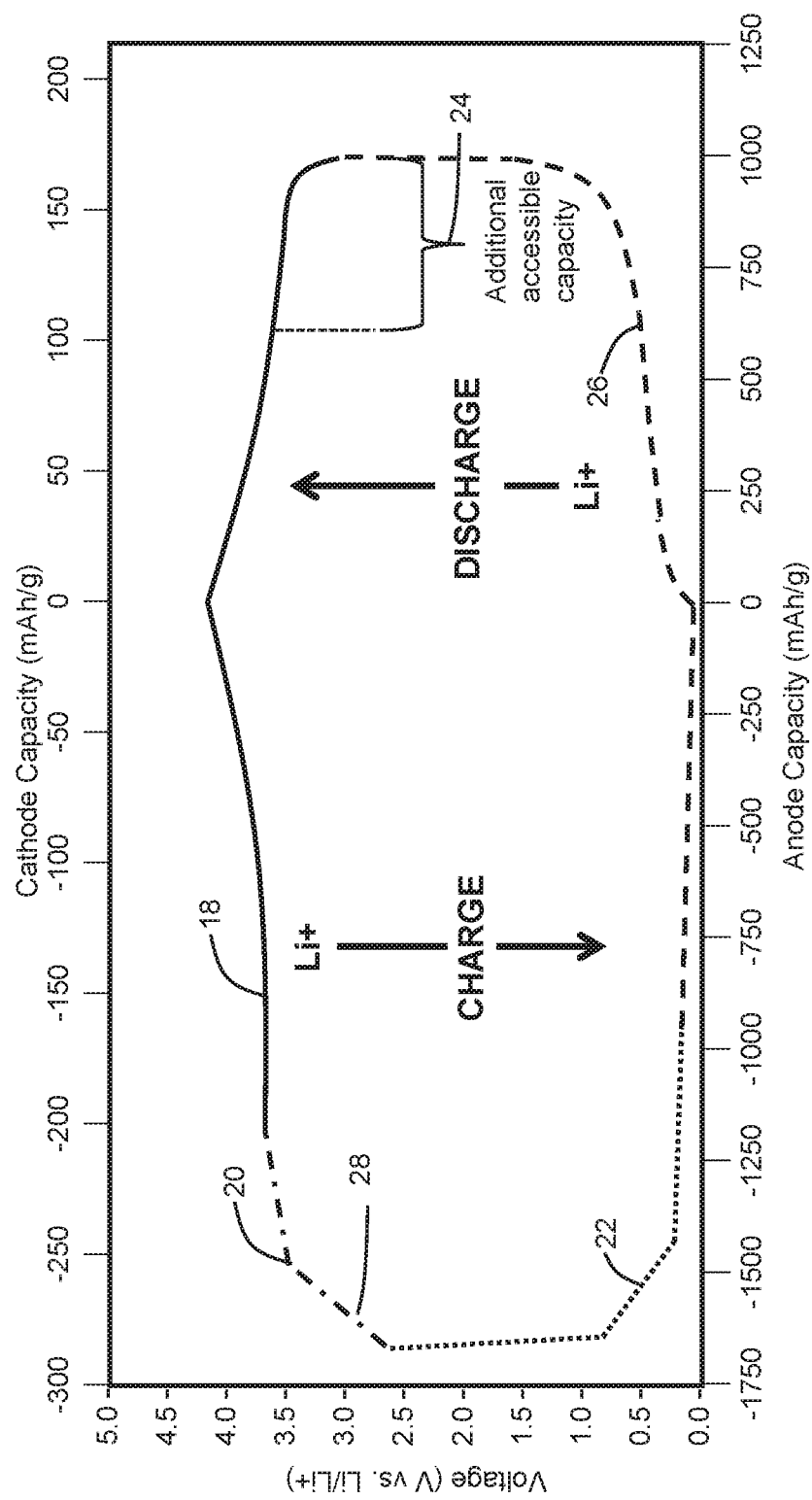
FIG. 1B illustrates a modeled capacity vs. voltage performance of a lithium-ion electrochemical cell comprising an anode and a cathode having a lithiation agent of $LiN_3$ therewithin.

FIGS. 1A and 1B illustrate simulated models of voltage vs. capacity performance for a lithium-ion electrochemical cell having cathodes constructed with (FIG. 1B) and without (FIG. 1A) a cathode lithiation agent. As defined herein "anode capacity" is the amount of electrical energy in ampere-hours that is stored within an anode. "Cathode capacity" is defined herein as the amount of electrical energy in ampere-hours that is stored within a cathode. As illustrated in FIGS. 1A and 1B, capacity per gram (mAh/g) of the respective anode and cathode is shown. In addition, it is noted that the voltage shown on the y-axis of the graphs of FIGS. 1A and 1B, is the voltage between the anode and cathode within an electrochemical cell.

FIG. 1A illustrates the simulated voltage vs. capacity curve of a lithium-ion electrochemical cell having an anode with an anode active material matrix comprising silicon, carbon and graphene as disclosed in U.S. Pat. No. 8,551,650 to Kung et al., and a cathode comprising LiNi$_{0.8}$Co$_{0.15}$Al$_{0.05}$O$_2$ that was formulated without a lithiation agent. While the anode in FIG. 1A was designed to preferably comprise silicon, carbon and graphene, it is noted that that the anode preferably comprises at least silicon. As the graph shows, the cathode (curve 10) has a cathode capacity (mAh/g) that ranges from about 223 mAh/g in an initially charged state to about 125 mAh/g in a reversible discharged state. The corresponding anode has a reversible capacity (mAh/g), as indicated by curve 12, ranging from about 1,000 mAh/g in the charged state to about 1,000 mAh/g in the discharged state. The irreversible anode capacity loss, indicated by curve 14, ranges from about −1,000 mAh/g to about −1,700 mAh/g consumes about 700 mAh/g. The irreversible capacity is the capacity that is lost during cycling that occurs during the initial charging of the cell. This irreversible capacity loss directly translates into lost cathode capacity, indicated by curve 16. As shown, the estimated cathode capacity that is lost is about 55 mAh/g as the reversible cathode capacity is estimated to be about 125 mAh/g from a theoretical value of 180 mAh/g. Therefore, the cathode only utilizes about 70% of its maximum reversible lithium capacity.

FIG. 1B, on the other hand, illustrates a simulated voltage vs. capacity curve for a lithium-ion electrochemical cell having a cathode that comprises a lithiation agent. Specifically, the simulated voltage vs. capacity curve is of a lithium-ion electrochemical cell having an anode with an anode active material matrix comprising silicon, carbon and graphene, as disclosed in U.S. Pat. No. 8,551,650 to Kung et al., and a cathode comprising about 86.6 weight percent LiNi$_{0.8}$Co$_{0.15}$Al$_{0.05}$O$_2$ and a lithiation agent of LiN$_3$, a lithium salt, that comprises about 13.4 weight percent of the total cathode active material and lithiation agent mixture.

In contrast to the capacity curve of the simulated lithium ion cell shown in FIG. 1A that does not comprise a lithiation agent, the addition of the lithiation agent, as illustrated in FIG. 1B, minimizes reversible capacity loss, and as a result, the cell of FIG. 1B has a reversible capacity that is significantly greater than the reversible capacity exhibited by the cell in FIG. 1A. As illustrated, the lithiation agent comprising cathode has a total cathode capacity (mAh/g) that ranges from about −280 mAh/g in the initially charged state to about 180 mAh/g in the reversible discharged state. This total cathode capacity includes the capacity provided by the cathode active material, as indicated by curve 18 and the additional capacity provided by the lithiation agent, as indicated by curve 20.

The addition of the lithiation agent provides sacrificial lithium which compensates for the irreversible cathode capacity loss, indicated by curve 22, due to the irreversible reaction of the lithium with the silicon anode active element. The addition of the LiN$_3$ lithiation agent thus enhances the cathode capacity and results in a cathode in which capacity loss is minimized. As illustrated in FIG. 1B, in comparison to FIG. 1A, the capacity of the cell comprising the lithiation agent has an increased capacity of about 80 mAh/g as indicated by "additional accessible capacity" section 24 that ranges from 100 mAh/g to about 180 mAh/g, thus improving the capacity by about 80 mAh/g. Furthermore, as illustrated by FIG. 1B, the corresponding anode has a capacity, as indicated by curve 26 that ranges from about −950 mAh/g in the charged state to about 1,000 mAh/g in the discharged state. As shown, the addition of the LiN$_3$ lithiation agent increases the overall capacity of the cathode by about 80 mAh/g. Therefore, with the addition of the lithiation agent, the cathode achieves near maximum reversible lithium capacity. The addition of the lithiation agent thus translates into a lithium-ion electrochemical cell having a minimized capacity loss and a greater resultant capacity as compared to a lithium-ion cell that does not comprise a lithiation agent.

In addition, as illustrated in FIG. 1B, the specific capacity contribution of the LiN$_3$ lithiation agent, a lithium salt, occurs within a voltage range from about 3 to about 3.5 V which corresponds to the lithium extraction window for lithium salts, as provided in Table II. In a preferred embodiment, the lithiation agent is selected such that its lithium extraction voltage window corresponds with the initial charge state 28 of the cathode as shown in FIG. 1B. Thus, it is preferred that the lithium-ion electrochemical cell be constructed with a specifically paired anode and cathode such that the charge state, particularly the initial charge state 28, occurs at a voltage within the lithium voltage extraction window of the lithiation agent.

The lithiation agent or lithiation agents are preferably combined with the cathode active material during fabrication of the cathode. In a preferred embodiment, the lithiation agent comprises from about 0.01 weight percent to about 15.0 weight percent of the total cathode material formulation. More preferably, the lithiation agent comprises from about 1 weight percent to about 5 weight percent of the cathode material formulation. Most preferably, the lithiation agent comprises from about 0.5 weight percent to about 2 weight percent of the total cathode material mixture.

The lithiation agent may be added to the cathode active material in a dry powder form. The lithiation agent can also undergo further treatment/processing with the cathode active material to enhance activity. Alternatively, the lithiation agent may be combined with at least one solvent such an alcohol or a non-aqueous solvent to thereby form a lithiation solution that is then added to the cathode active material. Preferred lithiation agent solvents may comprise water, dimethylformamide, N-methyl-2-pyrrolidone, or combinations thereof. In a preferred embodiment, the lithiation solution may comprise from about 1 weight percent to about 99 weight percent lithiation agent, the remainder being the solvent or solvent solution. Preferably about 0.5 mL to about 30 mL of the lithiation solution may be added to the cathode active material. Alternatively, the lithiation solution may comprise from about 1 weight percent to about 35 weight percent of the total cathode material formulation.

Figure 2A:
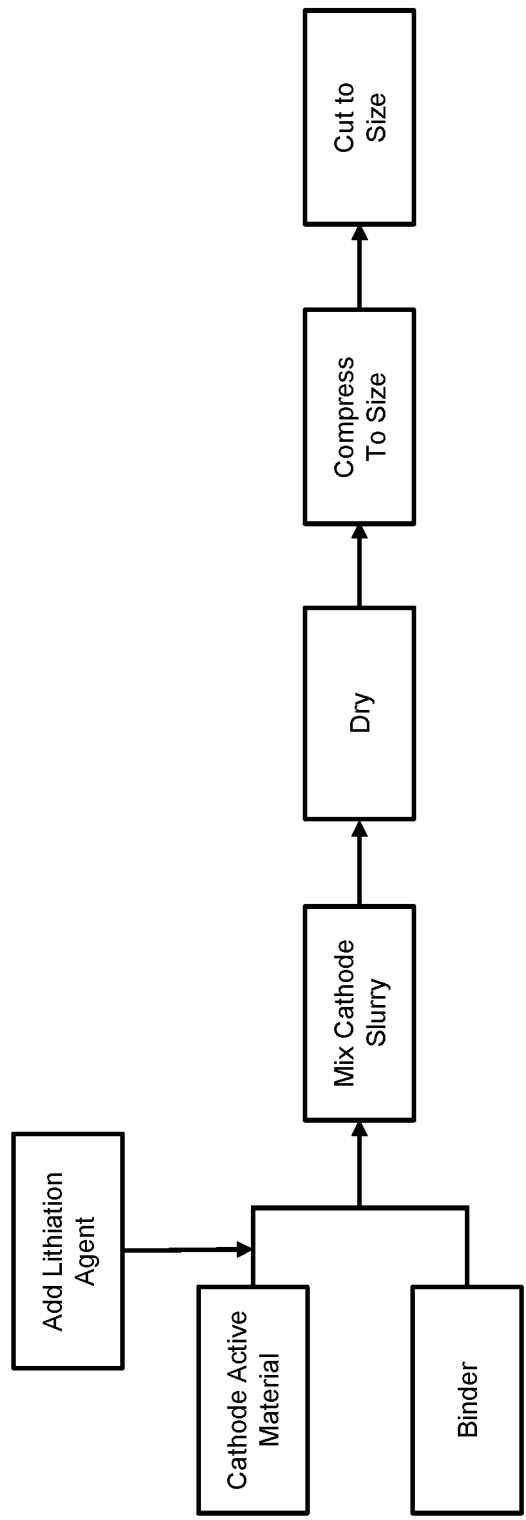
FIG. 2A is a flow chart illustrating an embodiment of a sequence of steps in constructing a cathode of the embodiments of the present invention.

FIG. 2A is a process flow chart that illustrates an embodiment of constructing a cathode of a lithium-ion cell of the embodiment of the present invention. As shown, the cathode active material is combined with a binder solution to create a cathode slurry formulation that is then coated on a cathode current collector. The coating is then allowed to dry before it is sized for incorporation into a cell. In a preferred embodiment, the lithiation agent is combined with the cathode active material prior to the addition of the binder. However, it is contemplated that the lithiation agent or lithiation agent solution may be added to the cathode slurry formulation that comprises a binder and other solvents.

Alternatively, it is contemplated that the cathode active material and lithiation agent may be reacted together by chemical addition, reaction or otherwise intimate contact of the various materials thereof to form a cathode lithium matrix material. The cathode lithium matrix material is preferably formed by the chemical addition, reaction, or otherwise intimate contact of at least the cathode active material and the lithiation agent, preferably during thermal treatment, sol-gel formation, chemical vapor deposition, or hydrothermal synthesis. In this embodiment, the cathode active material and the lithiation agent may be heated together above ambient temperature for about 1 to 5 hours. For example, the cathode active material and the lithiation agent may be heated together at a temperature ranging from about 50° C. to about 800° C. for about 1 to 5 hours.

In a further alternate embodiment, the lithiation agent may be combined with the anode active material such as graphene. In this embodiment, either a dry lithiation agent powder or the lithiation solution, as previously discussed, may be added to the anode active material. Similar to the cathode formulation, it is preferred that the lithiation agent comprises from about 0.01 weight percent to about 15.0 weight percent of the anode active material formulation that comprises the anode.

Figure 2B:
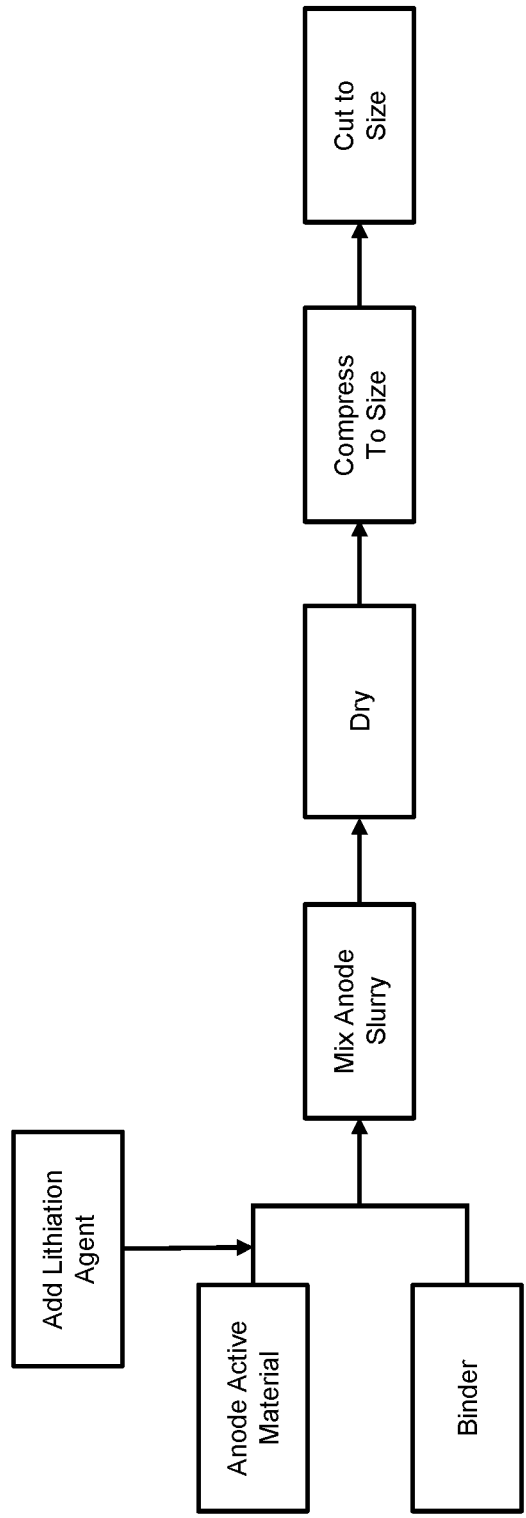
FIG. 2B is a flow chart illustrating an embodiment of a sequence of steps in constructing an anode of the embodiments of the present invention.

FIG. 2B is a process flow chart that illustrates an embodiment of constructing an anode of a lithium-ion cell of the embodiment of the present invention. As shown, the anode active material is combined with a binder solution to create an anode slurry formulation that is then coated on an anode current collector. The coating is then allowed to dry before it is sized for incorporation into a cell. In a preferred embodiment, the lithiation agent is combined with the anode active material prior to the addition of the binder. However, it is contemplated that the lithiation agent or lithiation agent solution may be added to the anode slurry formulation that comprises a binder and other solvents.

In a broader sense, it is contemplated by the scope of the embodiments of the present invention that the lithiation agent, having a lithiation capacity, is any material which increases the electrical capacity of a lithium-ion electrochemical cell, particularly after an initial charge cycle. Specifically, the addition of the lithiation agent preferably increases the capacity of either the cathode and/or the anode within a lithium-ion electrochemical cell. For example, antifluorite lithium iron oxide ($Li_5FeO_4$) has a theoretical specific capacity of about 867 mAh/g and an experimentally measured specific capacity of about 700 mAh/g. Lithiated metal fluorides, such as $Li_xMF_x$ where x ranges from about 0.01 to about 3 and M is a metal that comprises iron (Fe), manganese (Mn), cobalt (Co), nickel (Ni), copper (Cu), vanadium (V), chromium (Cr) and non-metals such as bismuth (Bi) have a theoretical specific capacity of about 712 mAh/g and an experimentally measured specific capacity of about 448 mAh/g. Lithiated salts, such as $Li_2C_3O_5$ and $LiN_3$ generally have a theoretical specific capacity of about 567 and an experimentally measured capacity of about 430 mAh/g. Lithiated metal nitrides, such as $Li_{3-x}M_xN$ where $0 \leq x \leq 0.8$ and M comprises cobalt (Co), nickel (Ni), copper (Cu), and combinations thereof have an experimentally measured specific capacity of about 760 mAh/g. In addition, lithium sulfide has a theoretical specific capacity of about 1166 mAh/g and an experimentally measured specific capacity of over 800 mAh/g. These lithiation agents, particularly those having a significantly high specific capacity of greater than 500 mAh/g make for good lithiation agents that result in increased electrochemical cell capacities, particularly during the initial charge cycle.

In a preferred embodiment, after the lithiation agent is mixed with either the cathode active material or the anode active material, a binder material such as polyvinylidene fluoride (PVDF), vinylidene fluoride/hexafluoropropylene copolymer, polyacrylonitrile, polymethylmethacrylate, polytetrafluoroethylene, and mixtures thereof is added to the cathode or anode material mixture. In a preferred embodiment, the binder material comprises about 1 to about 5 weight percent of the cathode or anode active mixture. A preferred cathode or anode active mixture thus includes a binder present at about 3 weight percent, the lithiation agent at about 10 weight percent and the cathode or anode active material at about 87 weight percent of the cathode or anode matrix material.

Cathode and anode components for incorporation into a lithium-ion electrochemical cell according to the embodiments of the present invention may be prepared by rolling, spreading or pressing the mixture of the lithiation agent and cathode or anode active material onto a suitable current collector selected from the group consisting of stainless steel, titanium, tantalum, platinum, gold, copper, aluminum, cobalt nickel alloys, nickel-containing alloys, highly alloyed ferritic stainless steel containing molybdenum and chromium, and nickel-, chromium- and molybdenum-containing alloys. The preferred cathode current collector material is aluminum. The preferred anode current collector material is copper. Cathodes or anodes prepared as described above may be in the form of one or more plates operatively associated with at least one or more plates of anode material, or in the form of a strip wound with a corresponding strip of anode material in a structure similar to a "jellyroll".

Such composite materials as those described above may be pressed into a cathode or anode pellet with the aid of a suitable binder material such as a fluoro-resin powder, preferably polytetrafluoroethylene (PTFE) powder. In some cases, no binder material or electronic conductor material is required to provide a similarly suitable cathode or anode body.

For example, the electrode material mixture is preferably mixed with a binder material such as a powdered fluoropolymer, more preferably powdered polytetrafluoroethylene or powdered polyvinylidene fluoride present at about 1 to about 5 weight percent of the cathode or anode active mixture. The preferred cathode or anode mixture thus includes a powdered fluoro-polymer binder present at a quantity of at least about 3 weight percent, the lithiation agent at a quantity of at least about 5 weight percent and from about 80 to about 92 weight percent, the cathode or anode active material.

The exemplary cell of the embodiments of the present invention further includes a separator to provide physical separation between the anode and cathode. The separator is of an electrically insulative material to prevent an internal electrical short circuit between the electrodes, and the separator material also is chemically unreactive with the anode and cathode active materials and both chemically unreactive with and insoluble in the electrolyte. In addition, the separator material has a degree of porosity sufficient to allow flow therethrough of the electrolyte during the electrochemical reaction of the cell. Illustrative separator materials include non-woven glass, polypropylene, polyethylene, microporous material, glass fiber materials, ceramics, polytetrafluorethylene membrane commercially available under the designations ZITEX (Chemplast Inc.), polypropylene membrane, commercially available under the designation CELGARD (Celanese Plastic Company Inc.) and DEXIGLAS (C. H. Dexter, Div., Dexter Corp.).

The form of the separator typically is a sheet which is placed between the anode and cathode and in a manner preventing physical contact therebetween. Such is the case when the anode is folded in a serpentine-like structure with a plurality of cathode plates disposed intermediate the anode folds and received in a cell casing or when the electrode combination is rolled or otherwise formed into a cylindrical "jellyroll" configuration.

The exemplary electrochemical cell of the embodiments of the present invention is preferably activated with a nonaqueous, ionically conductive electrolyte operatively associated with the anode and the cathode. The electrolyte serves as a medium for migration of lithium ions between the anode and the cathode during electrochemical reactions of the cell, particularly during discharge and re-charge of the cell. The electrolyte is comprised of an inorganic salt dissolved in a nonaqueous solvent and more preferably an alkali metal salt dissolved in a mixture of low viscosity solvents including organic esters, ethers and dialkyl carbonates and high conductivity solvents including cyclic carbonates, cyclic esters and cyclic amides.

Additional low viscosity solvents useful with the embodiments of the present invention include dialkyl carbonates such as tetrahydrofuran (THF), methyl acetate (MA), diglyme, trigylme, tetragylme, dimethyl carbonate (DMC), 1,2-dimethoxyethane (DME), 1,2-diethoxyethane (DEE), 1-ethoxy,2-methoxyethane (EME), ethyl methyl carbonate, methyl propyl carbonate, ethyl propyl carbonate, diethyl carbonate (DEC), dipropyl carbonate, and mixtures thereof. High permittivity solvents include cyclic carbonates, cyclic esters and cyclic amides such as propylene carbonate (PC), ethylene carbonate (EC), butylene carbonate, acetonitrile, dimethyl sulfoxide, dimethyl formamide, dimethyl acetamide, γ-valerolactone, γ-butyrolactone (GBL), N-methyl-2-pyrrolidone (NMP), and mixtures thereof.

The preferred electrolyte of the embodiments of the present invention comprises an inorganic salt having the general formula $YAF_6$ wherein Y is an alkali metal similar to the alkali metal comprising the anode and A is an element selected from the group consisting of phosphorous, arsenic and antimony. Examples of salts yielding $AF_6$ are: hexafluorophosphate ($PF_6$), hexafluoroarsenate ($AsF_6$) and hexafluoroantimonate ($SbF_6$). In addition, other salts may comprise lithium salts including $LiPF_6$, $LiBF_4$, $LiAsF_6$, $LiSbF_6$, $LiClO_4$, $LiO_2$, $LiAlCl_4$, $LiGaCl_4$, $LiC(SO_2CF_3)_3$, $LiN(SO_2CF_3)_2$, LiSCN, $LiO_3SCF_3$, $LiC_6FSO_3$, $LiO_2CCF_3$, $LiSO_6F$, $LiB(C_6H_5)_4$, $LiCF_3SO_3$, and mixtures thereof. More preferably, the electrolyte comprises at least one ion-forming alkali metal salt of hexafluoroarsenate or hexafluorophosphate dissolved in a suitable organic solvent wherein the ion-forming alkali metal is similar to the alkali metal comprising the anode. The alkali metal salt of the electrolyte preferably comprises either lithium hexafluoroarsenate or lithium hexafluorophosphate dissolved in a 50/50 solvent mixture (by volume) of EC/DMC. In the embodiments of the present invention, the preferred electrolyte is 0.8M to 1.5M $LiAsF_6$ or $LiPF_6$ dissolved in a 50:50 mixture, by volume, of dimethyl carbonate and ethylene carbonate.

The preferred form of the electrochemical cell is a lithium ion cell wherein the anode/cathode couple is inserted into a conductive metal casing. A preferred material for the casing is stainless steel, although titanium, mild steel, nickel, nickel-plated mild steel and aluminum are also suitable. The casing may comprise a metallic lid having a sufficient number of openings to accommodate a glass-to-metal seal/terminal pin feedthrough for the cathode and anode. An additional opening may be provided for electrolyte filling. The casing header comprises elements having compatibility with the other components of the electrochemical cell and is resistant to corrosion. The cell is thereafter filled with the electrolyte solution described hereinabove and hermetically sealed, such as by close-welding a stainless steel plug over the fill hole, but not limited thereto. The cell of the embodiments of the present invention can also be constructed in a case-positive design.

The glass-to-metal seal preferably comprises a corrosion resistant glass having from between about 0% to about 50% by weight silica such as CABAL 12, TA 23 or FUSITE MSG-12, FUSITE A-485, FUSITE 425 or FUSITE 435. The positive terminal pin feedthrough preferably comprises titanium although molybdenum and aluminum can also be used. The cell header comprises elements having compatibility with the other components of the electrochemical cell and is resistant to corrosion. The cell is thereafter filled with the electrolyte described hereinabove and hermetically sealed such as by close-welding a stainless steel ball over the fill hole, but not limited thereto. When the ionically conductive electrolyte becomes operatively associated with the anode and the cathode of the cell, an electrical potential difference is developed between terminals operatively connected to the anode and the cathode. During discharge, lithium ions migrate from the anode, i.e., the negative electrode to the cathode, i.e., the positive electrode. During recharge, lithium ions migrate in the opposite direction from the cathode to the anode. Migration of the lithium ions between the anode and cathode preferably occurs in atomic or molecular forms.

Thus, electrochemical cells constructed with a cathode comprising the mixture of a lithiation agent and cathode active material formulation of the embodiments of the present invention have an increased charge/discharge voltage and capacity and an improved rate capability. The above detailed description and examples are intended for purposes of illustrating the invention and are not to be construed as limited.

What is claimed is:
1. An electrochemical cell, comprising:
   a negative electrode comprising a negative electrode active material having an active constituent;
   a positive electrode comprising:

a lithium containing positive electrode active material; and based on the total weight of the positive electrode, from about 0.01 wt % to about 15 wt % of a lithiation agent comprising $LiN_3$ or $Li_5FeO_4$; and an ionically conductive electrolyte located between the positive electrode and the negative electrode.

2. The electrochemical cell of claim 1, wherein:

the positive electrode active material has a first lithium extraction voltage;

the lithiation agent has a second lithium extraction voltage; and the first lithium extraction voltage is greater than the second lithium extraction voltage.

3. The electrochemical cell of claim 1, wherein:

the positive electrode active material has a first lithium extraction voltage;

the lithiation agent has a second lithium extraction voltage; and the first lithium extraction voltage is less than the second lithium extraction voltage.

4. The electrochemical cell of claim 1, wherein the negative electrode active material comprises silicon, carbon, antimony, lead, tin, germanium, or any combinations thereof.

5. The electrochemical cell of claim 1, wherein during operation of the electrochemical cell, lithium from the lithiation agent irreversibly reacts with the negative electrode active material to form a lithium compound in the negative electrode or in a solid electrolyte-interphase layer on an exterior surface of the negative electrode.

6. The electrochemical cell of claim 5, wherein the lithium deintercalates from the lithiation agent, at a lithiation agent extraction voltage and irreversibly reacts with the negative electrode active material to form the lithium compound that does not substantially deintercalate lithium during a subsequent discharge step of the battery, the lithium compound comprising an organic or inorganic compound comprising lithium.

7. The electrochemical cell of claim 1, wherein the positive electrode active material comprises a lithium metal oxide, a lithium metal fluoride, a lithium sulfide, a lithium metal sulfide, a lithium metal phosphate, a lithium metal silicate, or any combinations thereof, wherein the metal comprises a transition metal from the Periodic Table of Elements.

8. The electrochemical cell of claim 1, wherein the positive electrode active material comprises $LiNi_xCo_yAl_zO_2$, wherein x+y+z=1, $LiCoO_2$, $LiFePO_4$, $LiMn_2O_4$, $Li_2S$, $LiNi_xMn_yCo_zO_2$, wherein $0.3 \leq x \leq 1.0$, $0.1 \leq y \leq 0.45$, $0.1 \leq z \leq 0.4$ and x+y+z=1, $MF_x$ wherein $0.1 \leq x \leq 3$, $Li_xMF_x$ wherein $0.1 \leq x \leq 3$, $LiMPO_4$, $Li_2MSiO_4$, or $LiMn_2O_4$—LiMO, wherein M is a transition metal from the Periodic Table of Elements.

9. A positive electrode of an electrochemical cell comprising a mixture of:

a positive electrode active material; and based on the total weight of the positive electrode, from about 0.01 wt % to about 15 wt % of a lithiation agent comprising $LiN_3$ or $Li_5FeO_4$.

10. The positive electrode of claim 9, wherein the positive electrode active material comprises a lithium metal oxide, a lithium metal fluoride, a lithium sulfide, a lithium metal sulfide, a lithium metal phosphate, a lithium metal silicate, or any combinations thereof, wherein the metal comprises a transition metal from the Periodic Table of Elements.

11. The positive electrode of claim 9, wherein positive electrode active material comprises silicon and graphene.

12. The positive electrode of claim 9, wherein the lithiation agent has a specific capacity of at least 400 mAh/g.

* * * * *